United States Patent
Fujiura

(10) Patent No.: US 12,427,885 B2
(45) Date of Patent: Sep. 30, 2025

(54) VEHICLE CONTROL DEVICE

(71) Applicant: TOYOTA JIDOSHA KABUSHIKI KAISHA, Toyota (JP)

(72) Inventor: Keiichi Fujiura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 18/426,733

(22) Filed: Jan. 30, 2024

(65) Prior Publication Data
US 2024/0326632 A1    Oct. 3, 2024

(30) Foreign Application Priority Data
Mar. 30, 2023    (JP) .................. 2023-055848

(51) Int. Cl.
*B60L 53/66*    (2019.01)
(52) U.S. Cl.
CPC .................. *B60L 53/66* (2019.02)
(58) Field of Classification Search
CPC ........ B60L 53/66; B60L 53/305; B60L 53/65; G06F 8/65; H04L 67/06; H04L 67/12; H04W 4/021; H04W 4/40; H04W 76/20
See application file for complete search history.

(56) References Cited

U.S. PATENT DOCUMENTS

| | | | |
|---|---|---|---|
| 2019/0263271 A1* | 8/2019 | Ashby | G06Q 40/04 |
| 2021/0389940 A1 | 12/2021 | Iwata et al. | |
| 2022/0063426 A1* | 3/2022 | Chatziioannou | B60L 53/126 |
| 2022/0410754 A1 | 12/2022 | Sakurai et al. | |
| 2023/0138510 A1 | 5/2023 | Shizuka et al. | |

FOREIGN PATENT DOCUMENTS

| | | |
|---|---|---|
| JP | 2021-105922 A | 7/2021 |
| WO | 2020/115819 A1 | 6/2020 |
| WO | 2021/177224 A1 | 9/2021 |
| WO | 2021/186204 A1 | 9/2021 |

\* cited by examiner

*Primary Examiner* — Mary Cheung
(74) *Attorney, Agent, or Firm* — SoraIP, Inc.

(57) ABSTRACT

The vehicle control device includes a processor, and the processor determines whether or not the vehicle is parked in the charging station area, and if the processor determines that the vehicle is parked in the charging station area, performs wireless data transmission/reception processing. Hold.

3 Claims, 2 Drawing Sheets

FIG. 3

VEHICLE CONTROL DEVICE

CROSS-REFERENCE TO RELATED APPLICATION

This application claims priority to Japanese Patent Application No. 2023-055848 filed on Mar. 30, 2023 incorporated herein by reference in its entirety.

BACKGROUND

1. Technical Field

The present disclosure relates to a vehicle control device.

2. Description of Related Art

WO2021/186204 discloses a technology for executing a software update process by using electric power supplied from an on-board battery when the battery is not being charged.

SUMMARY

In the technology disclosed in WO2021/186204, the software update process is executed by executing a wireless data transmission and reception (over the air (OTA)) process (hereinafter referred to as "OTA process"). When this OTA process is started, the battery cannot be charged. Therefore, the battery cannot be charged at a timing desired by a user, which may lead to user's dissatisfaction.

The present disclosure provides a vehicle control device that can eliminate user's dissatisfaction during an OTA process.

A vehicle control device according to the present disclosure includes a processor. The processor is configured to: determine whether a vehicle is stopped in a charging station area; and suspend a wireless data transmission and reception process when determination is made that the vehicle is stopped in the charging station area.

According to the present disclosure, it is possible to eliminate the user's dissatisfaction during the OTA process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device according to an embodiment of the present disclosure will be described with reference to the drawings. Note that the components in the embodiments below include those that can be easily replaced by those skilled in the art, or those that are substantially the same.

Vehicle Control Device

Figure 1:
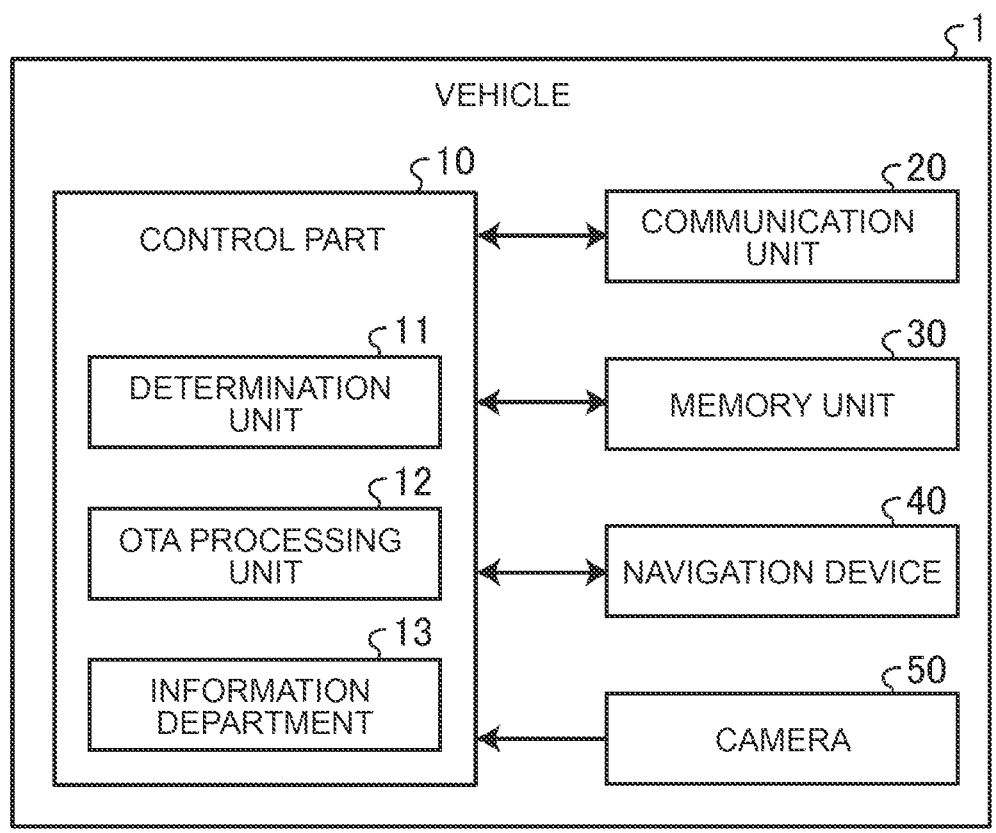
FIG. 1 is a block diagram showing a schematic configuration of a vehicle to which a vehicle control device according to an embodiment is applied.

The configuration of a vehicle to which a vehicle control device according to an embodiment is applied will be described with reference to FIG. 1. Vehicles to which the vehicle control device is applied are rechargeable vehicles, such as battery electric vehicles (BEVs), plug-in hybrid electric vehicles (PHEVs), and the like.

A vehicle 1 to which the vehicle control device according to the embodiment is applied includes a control unit 10, a communication unit 20, a storage unit 30, a navigation device 40, and a camera 50. Note that, in FIG. 1, out of the actual configuration of the vehicle 1, only the configuration essential for realizing the vehicle control device according to the embodiment is extracted and shown. Therefore, although not shown in the figure, the vehicle 1 naturally also includes a motor, a battery, an inverter, and the like.

The control unit 10 is an Electronic Control Unit (ECU) whose main component is a microcomputer consisting of, for example, a Central Processing Unit (CPU), Read Only Memory (ROM), Random Access Memory (RAM), etc., and executes various programs.

The control unit 10 loads the program stored in the storage unit 30 into the work area of the main storage unit and executes it, and controls each component etc. through the execution of the program, thereby achieving functions that meet a predetermined purpose, do. The control unit 10 functions as a determination unit 11, an OTA processing unit 12, and a notification unit 13 through execution of a program stored in the storage unit 30.

The determination unit 11 determines whether the vehicle 1 is parked in a charging station area. The determination unit 11 performs the above determination based on, for example, the position information of the vehicle 1 detected by the GPS positioning means of the navigation device 40 (hereinafter referred to as "vehicle position information") and (the information of the position of the charging station area included in) the map information stored in the storage unit 30.

Further, the determination unit 11 may perform the above determination based on, for example, an image captured by the camera 50 (an image of the surroundings of the vehicle 1). In this case, it is determined whether the vehicle 1 is parked in the charging station area by inputting the image captured by the camera 50 into an AI model created in advance and performing object recognition processing.

The OTA processing unit 12 performs OTA processing (OTA repro, wireless repro) for the vehicle 1. "OTA processing" specifically refers to transmitting and receiving data wirelessly. As will be described later, this OTA processing may be performed automatically by the OTA processing unit 12 as necessary, or may be performed based on an instruction (OTA processing start instruction) from the user (for example, the driver of the vehicle 1) by the OTA processing unit 12.

In this embodiment, it is assumed that the software of the control unit (charging ECU) that controls charging of the battery of the vehicle 1 is updated by OTA processing. There are two types of OTA processing, for example, "Classic Platform one-sided method (CP one-sided method)" and "Classic Platform two-sided method (CP two-sided method)." "Classic Platform (CP)" refers to embedded software.

The CP one-sided method is an OTA processing method using a microcomputer equipped with only one ROM in which software is written. In this method, at a timing when the microcomputer does not perform control (usually during IG-OFF), the OTA processing is completed by executing software deletion→software (update data) reception→software writing→activation (=resetting the microcomputer).

In this way, in the CP one-sided method, operations from software deletion to activation are executed while the vehicle 1 is stopped. Furthermore, in OTA processing using the CP one-sided method, the battery cannot be charged from software deletion to activation.

The CP two-sided method is an OTA processing method using a microcomputer equipped with two ROMs into which software is written. With this method, while one side is executing control, the other side can be rewritten. Therefore, it is possible to erase software→receive software (update data)→write software on the opposite side during IG-ON without worrying about power. After software writing to the opposite side is completed, the microcomputer is reset for side switching. This reset is executed at a timing when control execution is unnecessary (usually during IG-OFF).

As described above, in the CP two-sided method, operations from software erasing to software writing are executed while the vehicle 1 is running, and the microcomputer is reset for plane switching while the vehicle 1 is stopped. Furthermore, in OTA processing using the CP two-sided method, the battery cannot be charged while the microcomputer is being reset for switching the planes.

At a typical paid charging station, the vehicle 1 can be charged, for example, by a user operating the charging station and performing billing processing. On the other hand, as described above, since charging is not possible during OTA processing, if the timing of OTA processing and charging overlap, there is a risk that the battery may not be charged at the timing desired by the user. Furthermore, there is a possibility that it will be discovered that charging is not possible after charging the charging station, which may put the user at a disadvantage.

Therefore, when the determination unit 11 determines that the vehicle 1 is parked in the charging station area, the OTA processing unit 12 suspends the OTA processing. That is, when the vehicle 1 is stopped at a charging station area, the OTA processing unit 12 prioritizes charging the battery and does not start OTA processing. For example, as in the above-mentioned CP two-sided method, even if update data is received when the vehicle 1 stops at a charging station area, the OTA processing unit 12 interrupts the OTA processing at that point, and processing is not performed.

In this way, when the vehicle 1 is stopped at a charging station area, by giving priority to charging the battery, the battery can be charged at the timing desired by the user. Further, since charging is not impossible after charging the charging station, disadvantages to the user can be avoided.

Note that, as described above, if charging of the battery is completed after the OTA processing is suspended by the OTA processing unit 12, the OTA processing may be started as is by the OTA processing unit 12, or the OTA processing may be started by the user. The OTA process may be started after waiting for an instruction.

The notification unit 13 notifies the user that charging is not possible. For example, if the determination unit 11 determines that the vehicle 1 is parked in a charging station area, and the user attempts to perform an OTA process, the user is notified that the vehicle 1 will not be able to be charged for a predetermined period of time if the OTA process is performed (charging is not possible).

Here, the above-mentioned "case where the user attempts to execute the OTA process" includes, for example, a case where the user issues an instruction to start the OTA process through a button, touch panel, etc. of the navigation device 40. Further, the "notification that charging is not possible during OTA processing" includes, for example, the fact that charging cannot be performed until OTA processing is completed, the time until OTA processing is completed (for example, a maximum of 15 minutes, etc.), and the like.

Further, the notification unit 13 notifies the user that charging is not possible during OTA processing, using text or voice, for example, through the display, speaker, etc. of the navigation device 40. Further, the notification unit 13 may notify the user that charging is not possible during OTA processing, for example, through an information processing terminal (for example, a smartphone, a tablet terminal, etc.) owned by the user.

In this way, when the vehicle 1 is parked in a charging station area and the user attempts to start OTA processing, by notifying that charging is not possible, charging operations by the user (especially charging the charging station) can be suspended. As a result, it is possible to notify the user that charging is not possible before the user charges the charging station, thereby avoiding any disadvantage to the user.

The communication unit 20 includes, for example, a Data Communication Module (DCM). The communication unit 20 transmits and receives data by communicating with a server (not shown) or the like during OTA processing.

The storage unit 30 includes recording media such as an erasable programmable ROM (EPROM), a hard disk drive (HDD), and a removable medium. Examples of removable media include disc recording media such as Universal Serial Bus (USB) memory, Compact Disc (CD), Digital Versatile Disc (DVD), and Blu-ray (registered trademark) Disc (BD). The storage unit 30 can store an operating system (OS), various programs, various tables, various databases, and the like.

The storage unit 30 stores, for example, software update data acquired by the OTA processing unit 12 through OTA processing, surrounding map information used by the navigation device 40, vehicle position information acquired by the navigation device 40, and the like. Note that the above map information includes, for example, information regarding the position of the charging station area in the map, the charge/free classification of the charging station area, and the fee (in the case of charge).

The navigation device 40 is a car navigation system installed in the vehicle 1, and includes output means such as a display and a speaker, and input means such as a microphone, buttons, and a touch panel. Furthermore, the navigation device 40 includes a GPS positioning means that receives radio waves from a GPS satellite and detects the current position (driving position) of the vehicle 1. Furthermore, the navigation device 40 may hold surrounding map information.

The camera 50 is realized by, for example, an imaging device incorporating an imaging element such as a Charge Coupled Device (CCD) or a CMOS Image Sensor (CMOS). This camera 50 is attached to the body of the vehicle 1 and captures an image of the surroundings of the vehicle 1. Further, the image captured by the camera 50 is used in the determination process in the determination unit 11.

Vehicle Control Method 1

Figure 2:
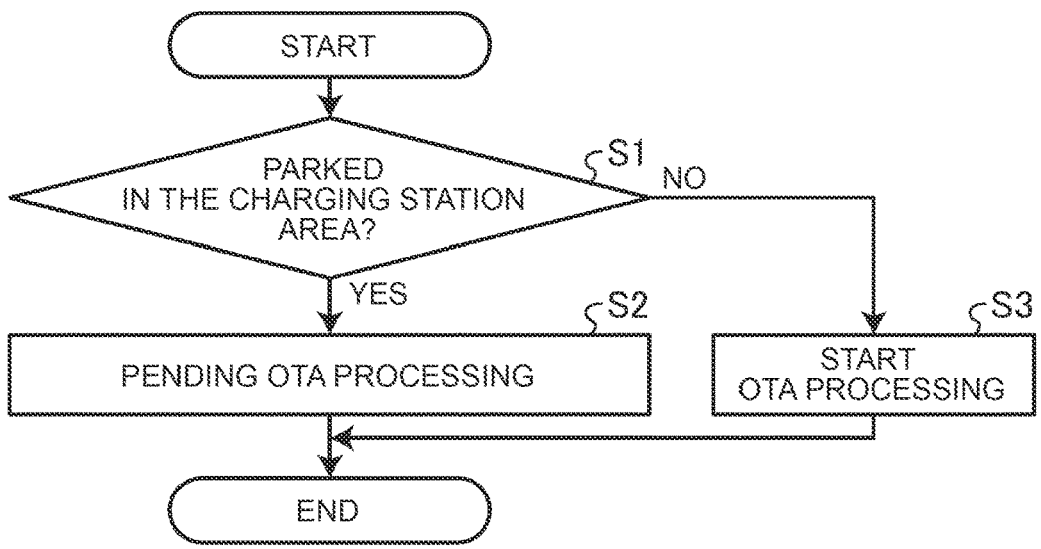
FIG. 2 is a flowchart showing a first control flow by the vehicle control device according to the embodiment.

The first control executed by the vehicle control device according to the embodiment will be described with reference to FIG. 2. An example in which the OTA processing unit 12 automatically performs OTA processing as necessary will be described below.

First, the determination unit 11 determines whether the vehicle 1 is parked in a charging station area (S1). The determination in S1 is performed based on, for example, information acquired from the navigation device 40 (vehicle position information, etc.), images acquired from the camera 50, and the like.

If it is determined in S1 that the vehicle 1 is parked in the charging station area (Yes in S1), the OTA processing unit 12 suspends the OTA processing (S2) and completes this processing. On the other hand, if it is determined in S1 that the vehicle 1 is not parked in the charging station area (No in S1), the OTA processing unit 12 starts OTA processing (S3) and completes this processing.

Note that the contents of the "OTA processing" in S2 and S3 are different depending on the CP one-sided method and the CP two-sided method. For example, in the case of the CP one-sided method, processes from software deletion to activation are suspended in S2, and these processes are started in S3. Further, in the case of the CP two-sided method, the process of resetting the microcomputer for switching the screen is suspended in S2, and this process is started in S3.

Further, in S2, after the OTA process is suspended, the user charges the battery of the vehicle 1 at the charging station. The battery charging operation by the user is performed, for example, in the following manner.

(1) Open the charging port lid of the vehicle 1 by pressing the switch inside the vehicle cabin.
(2) The user gets off the train.
(3) Operate the charging station and perform billing processing.
(4) Insert the charging gun into the charging port lid of the vehicle 1 and start charging.

Vehicle Control Method 2

Figure 3:
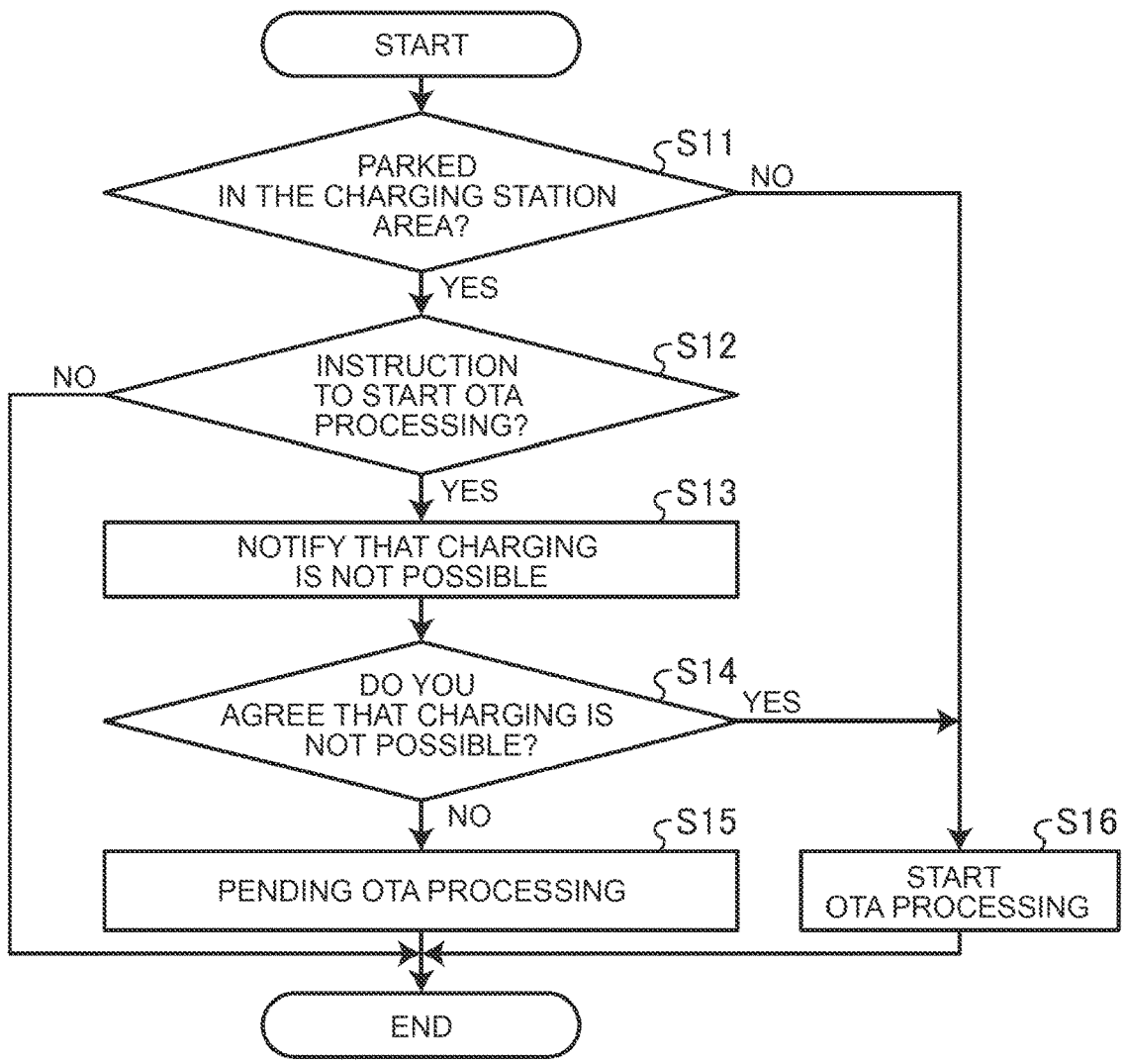
FIG. 3 is a flowchart showing a second control flow by the vehicle control device according to the embodiment.

The second control executed by the vehicle control device according to the embodiment will be described with reference to FIG. 3. An example in which the OTA processing unit 12 performs OTA processing based on instructions from a user will be described below.

First, the determination unit 11 determines whether the vehicle 1 is parked in a charging station area (S11). The determination in S11 is performed based on, for example, information acquired from the navigation device 40 (vehicle position information, etc.), images acquired from the camera 50, and the like.

If it is determined in S11 that the vehicle 1 is parked in the charging station area (Yes in S11), the OTA processing unit 12 determines whether there is an instruction to start OTA processing (S12). The determination in S12 is made based on, for example, whether the user has instructed to start OTA processing through a button, touch panel, etc. of the navigation device 40.

If it is determined in S12 that there is an instruction to start OTA processing (Yes in S12), the notification unit 13 notifies the user that charging is not possible during OTA processing, for example, through the display, speaker, etc. of the navigation device 40 (S13). The "notification that charging is not possible during OTA processing" in S13 includes, for example, the fact that charging cannot be performed until OTA processing is completed, the time required until OTA processing is completed (for example, a maximum of 15 minutes, etc.), and the like.

Subsequently, the OTA processing unit 12 determines whether the user has consented to the prohibition of charging (S14). The determination in S14 is made based on, for example, whether the user has performed a consent operation through a button, touch panel, etc. of the navigation device 40.

If it is determined in S14 that the user has not consented to the prohibition of charging (No in S14), the OTA processing unit 12 suspends the OTA processing (S15) and completes this processing. On the other hand, if it is determined in S14 that the user has consented to the prohibition of charging (Yes in S14), the OTA processing unit 12 starts OTA processing (S16) and completes this processing.

Note that if it is determined in S11 that the vehicle 1 is not parked in the charging station area (No in S11), the OTA processing unit 12 proceeds to S16. Further, in S12, if it is determined that there is no OTA process start instruction (No in S12), the OTA processing unit 12 completes this process.

In the vehicle control device according to the embodiment described above, when the vehicle 1 stops at a charging station area, OTA processing is suspended. This makes it possible to avoid a situation in which charging is not possible due to OTA processing. Therefore, the battery can be charged at the timing desired by the user. Further, since charging is not impossible after charging the charging station, disadvantages to the user can be avoided.

Further, in the vehicle control device according to the embodiment, when the vehicle 1 stops at a charging station area and when the user attempts to start OTA processing, a notification that charging is not possible is performed. Thereby, it is possible to avoid a state in which charging is not possible due to OTA processing against the user's intention. Further, for example, since it is possible to notify the user that charging is not possible before the user charges the charging station, it is possible to avoid disadvantage to the user.

As described above, the vehicle control device according to the embodiment can eliminate user dissatisfaction during OTA processing.

Further advantages and modifications can be easily deduced by those skilled in the art. Therefore, the broader aspects of the disclosure are not limited to the specific details and representative embodiments shown and described above. Accordingly, various changes may be made without departing from the spirit or scope of the general inventive concept as defined by the appended claims and their equivalents.

What is claimed is:

1. A vehicle control device comprising a processor, wherein the processor is configured to:
   determine whether a vehicle is stopped in a charging station area; and
   suspend a wireless data transmission and reception process when determination is made that the vehicle is stopped in the charging station area.

2. The vehicle control device according to claim 1, wherein the processor is configured to, when determination is made that the vehicle is stopped in the charging station area and a user attempts to execute the wireless data transmission and reception process, notify the user that the vehicle is not chargeable for a predetermined period when the wireless data transmission and reception process is executed.

3. The vehicle control device according to claim 1, wherein the processor is configured to determine whether the vehicle is stopped in the charging station area based on information acquired from a navigation device mounted on the vehicle or an image acquired from a camera mounted on the vehicle.

* * * * *